United States Patent
Hickey et al.

[15] 3,691,730
[45] Sept. 19, 1972

[54] FUEL TANK INERTING SYSTEM

[72] Inventors: William G. Hickey, Corona Del Mar; Richard L. Kenyon, Costa Mesa, both of Calif.

[73] Assignee: Parker-Hannifin Corporation, Cleveland, Ohio

[22] Filed: May 18, 1971

[21] Appl. No.: 144,589

[52] U.S. Cl. ............... 55/166, 55/196, 220/88 B, 244/135, 261/77, 261/121
[51] Int. Cl. ............................................. B01d 19/00
[58] Field of Search ........ 55/18, 21, 47, 53, 159, 160, 55/166, 196, 199; 220/88 B; 244/135; 261/77, 121

[56] References Cited

UNITED STATES PATENTS

| | | | |
|---|---|---|---|
| 2,870,936 | 1/1959 | Clayton | 220/88 B |
| 3,229,446 | 1/1966 | Sebastien et al. | 55/53 |
| 3,590,559 | 7/1971 | Bragg | 55/21 X |
| 3,628,758 | 12/1971 | Nichols | 55/53 X |

*Primary Examiner*—Reuben Friedman
*Assistant Examiner*—R. W. Bruks
*Attorney*—John N. Wolfram

[57] ABSTRACT

A fuel tank inerting system in which the tank ullage contains a non-combustible gaseous mixture of fuel vapor, oxygen and an inert gas, such mixture from the ullage being circulated through incoming liquid fuel when the tank is being filled for scrubbing dissolved oxygen from the fuel and diluting the same as it rises to the tank ullage, and there being a means for introducing a fresh supply of inert gas from a separate source for continuing the scrubbing and diluting of oxygen from the incoming fuel only when the oxygen content of the tank ullage nears a predetermined yet non-combustible percentage, whereby a minimum amount of fresh inert gas is utilized for maintaining the ullage gases incombustible during filling of the tank and during subsequent ascending flight of the aircraft.

18 Claims, 3 Drawing Figures

PATENTED SEP 19 1972

3,691,730

INVENTORS
WILLIAM G. HICKEY
RICHARD L. KENYON
ATTORNEY
John N. Wolfram

FUEL TANK INERTING SYSTEM

BACKGROUND OF THE INVENTION

A mixture of air, which contains about 23 percent oxygen, with fuel vapor in the ullage of an aircraft fuel tank is highly combustible. To render the fuel vapor and air mixture incombustible it has heretofore been proposed to introduce an inert gas such as nitrogen into the tank ullage so as to reduce the oxygen content to about 10 percent or less, the exact percentage depending upon the particular conditions of pressure and temperature.

Liquid fuel in an aircraft tank at ground level atmospheric pressure normally contains oxygen dissolved therein in proportion to the ground level partial pressure of the oxygen in ambient air. As the aircraft ascends, oxygen is released from the liquid fuel into the tank ullage as pressure in the tank is decreased in accordance with the decrease in ambient pressure. At operating altitudes for jet aircraft enough oxygen will have been released from the fuel so that the oxygen content in the ullage would be about twice that when the aircraft is on the ground. Thus, even though the oxygen content of the ullage is 10 percent or less while the aircraft is on the ground, to maintain this percentage at operating altitude it is necessary to either add nitrogen as the aircraft ascends or to reduce the oxygen concentration in the tank to about 5 percent or less (preferably about 4.5 percent which provides some safety factor) while the aircraft is on the ground.

Although nitrogen must be carried on board for pressurizing the aircraft tank during descent if the ullage gases are to be maintained in a non-combustible mixture, utilization of nitrogen during ascent for scrubbing and diluting dissolved oxygen from the fuel, as disclosed, for example, in U.S. Pat. application, Ser. No. 711,020, now U.S. Pat. No. 3,590,559, requires not only a larger capacity dewar to be installed in the aircraft but also entails installation in the aircraft of sophisticated equipment for distributing and controlling the flow of the nitrogen to the tank during ascent.

On method of removing oxygen from fuel while the aircraft tank is being filled on the ground is disclosed in U.S. Pat. No. 3,229,446. In this method sufficient nitrogen may be introduced from a source on the ground external of the aircraft for scrubbing and diluting the oxygen from the incoming fuel as the tank is being filled so that when the tank is full the oxygen concentration in the ullage is about 4.5 percent or less. Because a rather large quantity of nitrogen must be vented to atmosphere along with oxygen and fuel vapor as the tank is being filled, the amount of nitrogen utilized by this method is considerable.

SUMMARY OF THE INVENTION

The disadvantages of the above described methods of introducing nitrogen either during ascent of the aircraft or on the ground during filling of the tank are overcome in the present invention by providing a system in which nitrogen already in the tank from a previous inerting operation is utilized for scrubbing and diluting oxygen from the fuel during the first part of a tank filling operation and by adding fresh nitrogen from a separate source only when the oxygen concentration in the ullage approaches 4.5 percent. In this manner the necessity for adding nitrogen to the tank during ascent of the aircraft is avoided and a minimum amount of nitrogen is used during the tank filling operation on the ground.

At sea level a fuel tank containing little or no fuel but containing fuel vapor and nitrogen gas that has been added to the tank to pressurize the same during descent of the aircraft will contain as little as 0.5 percent of oxygen. If this ullage gaseous mixture is utilized for removing oxygen from incoming fuel as the tank is being refueled, the oxygen content of the ullage will gradually increase and will be about 4.5 percent when the tank is about 55 percent full. The present invention provides for utilizing the ullage gases for this purpose and when the tank is about 55 percent full and the ullage oxygen content is about 4.5 percent the use of the ullage gases for this purpose is discontinued and fresh nitrogen either from a dewar in the aircraft or from a separate supply on the ground is cut in to continue the scrubbing and diluting function with enough fresh nitrogen being used to keep the ullage oxygen content to 4.5 percent or less. This is accomplished in one form of the invention by drawing the ullage gases into the incoming stream of liquid fuel by means of a tube leading from the ullage to an aspirating nozzle in the fuel supply line and automatically closing the tube and cutting in a separate supply of pure nitrogen when the tank is filled to about 55 percent of its capacity.

Closing of the tube is accomplished either by way of a float operated valve or by an electrically actuated valve controlled by a float operated switch. Cutting in of the separate nitrogen supply is simultaneously accomplished either by a pressure differential responsive valve actuated by lowering of pressure in the tube when the valve in the latter closes, or by an electrically operated valve actuated by the aforementioned float switch.

In another form of the invention the separate source of nitrogen is cut in without discontinuing utilization of the ullage nitrogen. In such case optimum utilization of nitrogen occurs if the separate source is cut in when the tank is from about 30 percent to 50 percent full, depending upon relative flow rates of the ullage nitrogen and fresh nitrogen, as well as other factors.

Thus, in its broadest aspects, the invention provides for mixing of inert ullage gases with incoming liquid fuel for removing oxygen from the latter, and utilizing a separate source of inert gas to augment the use of inert ullage gases only to the extent necessary to have the oxygen content of the ullage at a predetermined percentage when the tank has been filled with liquid fuel.

DETAILED DESCRIPTION

Figure 1:
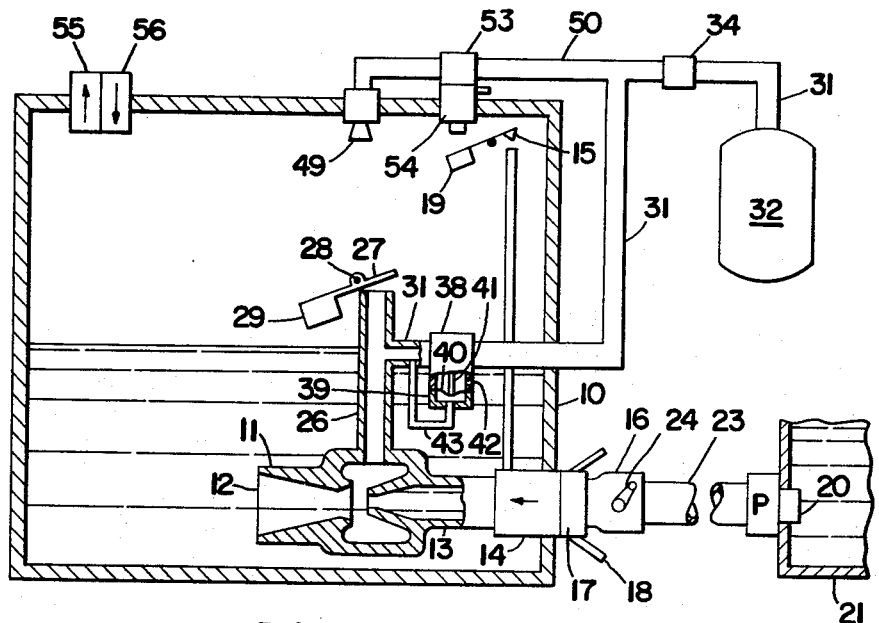
FIG. 1 is a schematic view of one form of the invention in which ullage gases are cut off by a float operated valve at a predetermined fuel level and a pressure differential device is thereupon actuated for cutting in a separate source of nitrogen.

In FIG. 1, aircraft fuel tank 10 has mounted therein an aspirating nozzle 11 having an opening 12 to the tank and having an inlet conduit 13 connected to a conventional fluid pressure operated level control valve 14 attached to the wall of tank 10 and controlled via pilot line 22 by a float operated pilot valve 15. A filling nozzle 16 may be connected to valve 14 by means of a rotatable connector sleeve 17 operable by handles 18. Nozzle 16 may, for example, be like that shown in U.S. Pat. No. 2,630,822 and valve 14 and its float valve 15 may be as shown in U.S. Pat. No. 3,011,752. A pump P has its inlet 20 connected to the interior of a supply tank 21 containing liquid fuel. The discharge side of pump P is connected by means of a hose or other conduit 23 to a conventional nozzle 15 having a valve therein openable by turning of a handle 24 after the nozzle is connected to valve 14.

Leading from aspirator 11 is a vertically disposed conduit 26. A valve element 27 is pivotally mounted at 28 on the upper end of conduit 26 and has attached thereto a float element 29, conduit 26 being of such length that float 29 will operate to cause valve 27 to close its upper end when liquid fuel has filled the tank to a predetermined level. Such predetermined level for the form of invention shown in FIG. 1 is preferably such that the tank will be filled no more than about 55% when valve 27 closes conduit 26.

Branching from conduit 26 is another conduit 31 which is connected to a dewar 32 carried in the aircraft, and containing liquid nitrogen. Alternately, conduit 32 may be connected to a separate dewar (not shown) that is on the ground. Conduit 31 may contain a heat exchanger 34 to assure that the liquid nitrogen will be delivered to conduit 26 in a gaseous state.

Contained in conduit 31 is a shut-off valve 38. Connected to valve 38 is a pressure differential device 39 having a diaphragm 40 connected by a rod 41 to valve 38 and whose upper side is vented to tank via a port 42 and whose lower side is exposed to pressure in conduit 31 via sensing line 43.

Mounted at the upper end of tank 10 is a nozzle 49 connected by a conduit 50 to dewar 32 by branch conduit 50 in which is installed a shut-off valve 53 controlled by a pressure differential device 54 that senses pressure within tank 10 and ambient pressure externally of tank 10. Device 54 actuates valve 53 to closed position when tank pressure exceeds ambient pressure by a predetermined amount, such as 0.5 psi for example, and causes valve 53 to open when tank pressure exceeds ambient pressure by less than such predetermined amount. If conduit 31 is connected to a dewar on the ground, dewar 32 is nevertheless provided in the aircraft and conduit 50 is connected to the same so that nitrogen may be utilized for pressurizing the tank during descent of the aircraft.

At the upper end of tank 10 is a climb valve 56 that opens to vent the interior of tank 10 to atmosphere when tank pressure exceeds ambient pressure by a predetermined amount, such as 0.5 psi for example. There is also a dive valve 56 that opens under emergency conditions when ambient pressure exceeds the tank pressure by an amount slightly more than the differential at which valve 51 opens.

After an aircraft having a fuel tank 10 fitted with the system shown in FIG. 1 is on the ground with tank 10 empty or only partly full of liquid fuel, the tank ullage will contain a mixture of fuel vapor, oxygen and nitrogen. Because nitrogen is added to the tank from dewar 32 for pressurizing the tank during descent of the aircraft, the oxygen content will be materially less than 4.5 percent and may be as low as 0.5 percent. Preparatory to filling of the tank with liquid fuel, nozzle 16 is connected to valve 14 and handle 24 is rotated to open the valve within nozzle 16. At this time, floats 29 and 19 will be at their lowermost positions by action of gravity and hold valve 27 and 15 in their open positions.

Upon actuation of pump P, liquid fuel will be pumped from tank 21 through conduits 23 and 13 into aspirator 11 and be discharged therefrom through opening 12 into tank 10. As fuel flows through aspirator 11 it creates a suction in conduit 26 that draws the mixture of fuel vapor, oxygen and nitrogen from the tank ullage past open valve 27 and through conduit 26 into aspirator 11. The gaseous mixture enters the stream of liquid fuel passing through the aspirator and entrains oxygen dissolved in the liquid fuel. Upon emergence of the gaseous mixture with the additional entrained oxygen from aspirator opening 12, the gaseous mixture rises through the liquid fuel to the tank ullage. As the ullage gases keep circulating through conduit 26 and aspirator 11 in this manner, the oxygen content gradually increases as the tank is being filled. As the liquid level rises, the pressure in the tank also tends to rise and will cause valve 55 to open and vent ullage gases to atmosphere to prevent the tank pressure from exceeding ambient pressure by more than the predetermined amount. The vented gases, which include nitrogen, are normally not collected and are lost.

By the time the liquid level has reached the point where the tank is about 55 percent full, the oxygen content of the ullage gases has reached about 4.5 percent and at this point float 29 is lifted by the liquid and actuates valve 27 to a position for closing conduit 26, thus cutting off further circulation of ullage gases through aspirator 11. Closing of valve 27 causes aspirator 11 to reduce the pressure within conduit 26 by an additional amount. This also reduces the pressure in conduit 31 and the lower side of diaphragm 40 via sensing lines 43, 44 so that diaphragm 40 and rod 41 move downward to open valve 38. This permits flow of pure nitrogen from dewar 48 into conduit 26 and aspirator 11 for continuing the action of scrubbing dissolved oxygen from the liquid fuel flowing through aspirator 11 into tank 10 and adds nitrogen to the tank ullage for maintaining the oxygen content therein at 4.5 percent or less while filling of the tank is completed. When the tank is full, float 19 will close valve 15 which in turn causes valve 14 to close and discontinue flow of fuel into the tank. This causes pressure in conduit 26 to increase until it is equalized with tank pressure. Diaphragm 40 then closes valve 38 to shut off flow of nitrogen into the tank. Handle 24 may now be turned for closing the valve in nozzle 16 and the latter may be disconnected from valve 14. The aircraft is now ready for flight.

As the aircraft climbs, ambient pressure decreases and climb valve 55 opens to vent ullage gases from tank 10 so that tank pressure will not exceed ambient by more than the predetermined amount. When tank pressure decreases because of consumption of fuel at operating altitude, and also when tank pressure must be increased during descent, differential pressure device 54 causes valve 53 to open for admitting nitrogen from dewar 32 through nozzle 49 to pressurize the tank so as to maintain the proper differential with respect to ambient pressure. Dive valve 56 opens for admitting air to the tank only in those emergency situations where valve 53 for some reason fails to open or where the supply of nitrogen in dewar 32 has been unexpectedly exhausted.

Upon emptying or partial emptying of tank 10 and the return of the aircraft to the ground, the ullage of tank 10 will contain a mixture of fuel vapor, oxygen and nitrogen in which the oxygen content will be considerably less than 4.5 percent and the tank again will be ready for filling in a manner to utilize the nitrogen therein for scrubbing oxygen from incoming fuel and to cut in the separate supply of nitrogen from only when the tank is again filled to the predetermined level, as above described.

Figure 2:
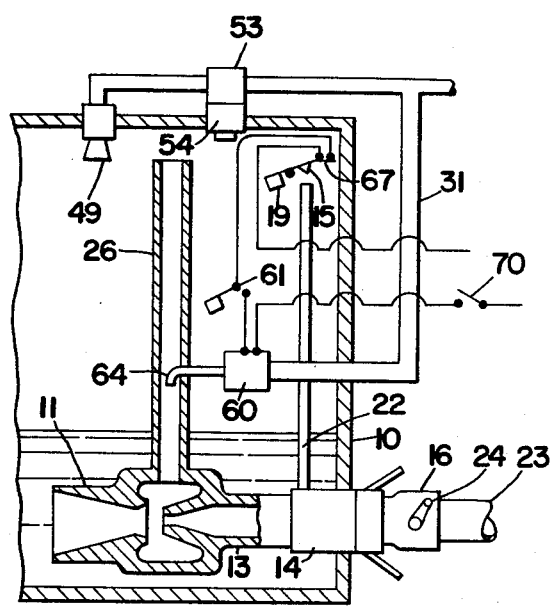
FIG. 2 is a schematic view of a modified form of the invention in which ullage gases are not cut off and a float operated switch actuates an electric valve for cutting in the separate nitrogen supply at a predetermined level of fill.

In the form of the invention shown in FIG. 2, conduit 26 extends to a position near the top of the tank and normally closed electrically operated valve 60 and float operated switch 61 replace differential pressure valve 38 and float operated valve 27 of FIG. 1, respectively. Sensing line 43 is omitted and conduit 64 connected to the outlet side of valve 60 enters conduit 26 and has its inner end directed downwardly as shown. Float 19 when in its lowered position closes a switch 67 in series with switch 61 while the tank is not full of liquid fuel and opens switch 67 when the tank is full. Another switch 70 in the power supply line may be closed and opened before and after the fueling operation either manually or automatically in conjunction with operation of fueling pump P or the plugging and unplugging of the grounding connections for the fueling equipment. Opening of switch 70 in this manner after fueling has been discontinued permits valve 60 to remain closed when fuel level during flight drops enough to permit float 19 to close switch 67 but not enough to open switch 61.

In this arrangement, when fuel is pumped through conduits 23 and 13 through aspirator 11 and into tank 10 while the fuel is below a predetermined level in the tank, ullage gases will be drawn into the upper end of tube 26 and into aspirator 11 to scrub dissolved oxygen from fuel passing through the aspirator in the same manner as described in connection with FIG. 1. When the fuel reaches the predetermined level in the tank, float switch 61 will be closed to energize and actuate valve 60 from a normal spring closed position to an open position for admitting pure nitrogen from dewar 32 through conduit 31 into conduit 26 where it will mix with ullage gases being drawn into conduit 26 and pass into aspirator 11 for scrubbing oxygen from liquid fuel passing therethrough. As with FIG. 1, ullage gases will vent through valve 55 during the filling operation and the feed of pure nitrogen from dewar 32 is so adjusted that the oxygen content of the ullage gases will be about 4.5 percent when the tank is full. Also, when the tank is full switch 67 is opened by float 19 to cause valve 60 to close for shutting off flow of nitrogen into the tank via conduit 31.

Figure 3:
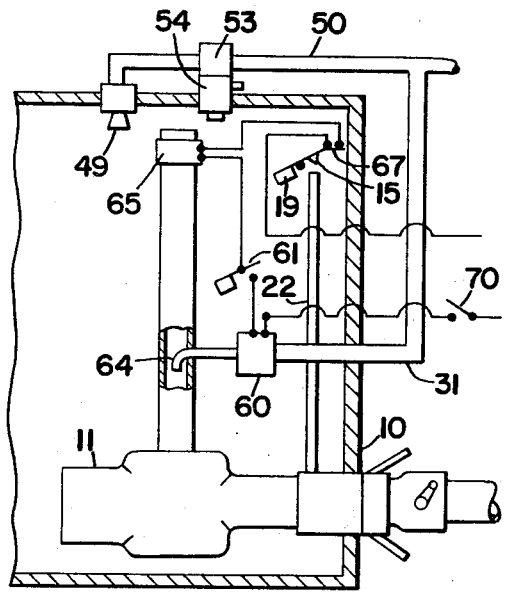
FIG. 3 is a schematic partial view of another form of the invention in which a float operated switch actuates one electric valve to discontinue utilization of ullage gases and actuates another electrically operated valve to open the separate nitrogen supply when the fuel in the tank has reached a predetermined level.

The arrangement of FIG. 3 is similar to that of FIG. 2 except that float operated switch 61 when closed also actuates a normally open electric valve 65 for closing the upper end of conduit 26 at the same time that the switch operates valve 60 to open position. Thus, in this arrangement conduit 26 is closed off when the tank is partially filled to prevent further circulation of ullage gases through aspirator 11 and in this respect is similar to FIG. 1. When the tank is full of fuel float operated switch 67 opens causing valve 65 to revert to its normally open position and valve 60 to its normally closed position. Also, switch 70 is opened and closed at the beginning and end of the tank filling operation for the same purpose and as described in connection with FIG. 2.

For all forms of the invention disclosed herein means have been described for shutting off flow of fuel and nitrogen to the tank when the tank is full of fuel. Shut off of these fluids can also be accomplished when the tank is only partially filled. For example, pump P is usually driven by an electric motor and the controls for the same commonly include a means for shutting off the motor and pump when a selected quantity of fuel is delivered to the tank. In the FIG. 1 form, such shutting off of fuel flow will automatically result in closing of valve 38, as already described. For FIGS. 2 and 3, a relay may be provided in the electric circuit for the motor for pump P for actuating switch 70 to closed position when pump P is turned on and to open position when the pump is turned off. In such case, valve 15 and switch 67 serve as safety devices for shutting off fuel and nitrogen flow when the tank is full of fuel in the event pump P has failed to shut off.

I claim:

1. An inerting system comprising a fuel tank whose ullage contains a sufficient supply of inert gas whereby the oxygen content of the ullage is below an amount that would support combustion of fuel vapor therein, a separate supply of inert fluid connected to the tank, first means for introducing liquid fuel into the tank for filling the same, second means for mixing said inert ullage gas with said incoming fuel to remove oxygen from the fuel, and third means for automatically initiating flow of said inert fluid to said tank when a predetermined amount of liquid fuel has been supplied to the tank.

2. The system of claim 1 in which there is a means for automatically stopping flow of said inert fluid to the tank when the latter is full of fuel.

3. The system of claim 1 in which said second means includes a valve controlled conduit connecting the ullage with the incoming liquid fuel and there is a fourth means that automatically causes the valve to close when a predetermined amount of liquid fuel has entered the tank.

4. The system of claim 1 in which said third means is automatically actuated by a float operated device to permit flow of said inert fluid into the tank when the liquid fuel has reached a predetermined level in the tank.

5. The system of claim 1 in which there is a means for automatically discontinuing flow of said inert fluid to the tank when flow of liquid fuel to the tank is discontinued.

6. The system of claim 1 in which there are means for automatically shutting off flow of incoming liquid fuel and flow of said inert fluid into the tank when the tank is substantially full of liquid fuel.

7. An inerting system comprising a fuel tank containing an inert gas in its ullage, first means including a first conduit for delivering liquid fuel from a supply source to said tank for filling the latter with the liquid fuel, second means including a second conduit for delivering inert fluid to the tank from a source other than the tank ullage, a third conduit connecting the ullage to the first conduit, and third means responsive to a predetermined level of liquid fuel in the tank for opening the second conduit.

8. The system of claim 7 in which said third means includes a valve actuated by a float operated device responsive to said predetermined level to cause closing of said third conduit.

9. The system of claim 7 in which said third means includes a float operated valve that closes the third conduit at said predetermined level.

10. The system of claim 7 in which said first conduit includes an aspirator and said third conduit is connected to the aspirator.

11. The system of claim 7 in which said second conduit is also connected to said aspirator.

12. The system of claim 11 in which said second conduit is connected to the aspirator via said third conduit.

13. The system of claim 7 in which said third means includes a float operated switch responsive to said predetermined level to cause opening of said second conduit and which also causes closing of said third conduit.

14. The system of claim 7 in which said third means is actuated upon the tank becoming filled to about 55 percent of its capacity.

15. The system of claim 8 in which there is a normally closed valve in said second conduit, means causing a lowering of fluid pressure within said third conduit when said float actuated valve closes, and there is a pressure differential operated device responsive to said lowering of fluid pressure in said third conduit for opening said normally closed valve.

16. The system of claim 7 in which said third conduit is always open to an upper region of the tank.

17. The system of claim 7 in which there is a supply of inert fluid in the aircraft connected by a fourth conduit to the tank, and there is a means actuated by a predetermined differential in pressure between the interior and exterior of the tank for opening the fourth conduit for introducing inert fluid from said supply in the aircraft to the tank when the aircraft descends in altitude.

18. The system of claim 7 in which there are automatically operated means for closing off both the supply of liquid fuel and inert fluid when the tank is substantially full.

* * * * *